US006808593B2

(12) United States Patent
McCardell

(10) Patent No.: US 6,808,593 B2
(45) Date of Patent: Oct. 26, 2004

(54) SPOT LAMINATOR WITH CHARGING BAR

(75) Inventor: Edward McCardell, Wild Rose, WI (US)

(73) Assignee: AF Machine Inc., Plover, WI (US)

(*) Notice: Subject to any disclaimer, the term of this patent is extended or adjusted under 35 U.S.C. 154(b) by 158 days.

(21) Appl. No.: 10/102,457

(22) Filed: Mar. 19, 2002

(65) Prior Publication Data

US 2003/0178148 A1 Sep. 25, 2003

(51) Int. Cl.7 ................................................ B32B 31/24

(52) U.S. Cl. ............................... 156/379.6; 156/379.8; 156/578; 118/244; 118/258

(58) Field of Search ........................... 156/379.6, 379.8, 156/547, 578, DIG. 35, DIG. 50; 118/244, 257, 258; 271/18.1, 33, 193

(56) References Cited

U.S. PATENT DOCUMENTS

| | | | | |
|---|---|---|---|---|
| 4,347,094 A | | 8/1982 | Watanabe | |
| 5,061,334 A | | 10/1991 | Paules | |
| 5,387,298 A | * | 2/1995 | Takagi et al. | 156/47 |
| 5,413,651 A | | 5/1995 | Otruba | |
| 5,482,593 A | | 1/1996 | Kuhn et al. | |
| 5,518,570 A | | 5/1996 | Takagi et al. | |
| 5,725,713 A | * | 3/1998 | Fischer | 156/247 |
| 5,776,289 A | | 7/1998 | Steidinger | |
| 5,895,622 A | | 4/1999 | Ramani et al. | |

FOREIGN PATENT DOCUMENTS

WO WO 95/11832 * 5/1995

OTHER PUBLICATIONS

"Chargemaster® Pinner™ Arc Resistant Charging Bars", http:// simco–static.com/simco/pdfs/Pinner.pdf, Feb. 21, 2002, SIMCO Industrial Static Control, 2 pp.

* cited by examiner

*Primary Examiner*—Blaine Copenheaver
*Assistant Examiner*—John T. Haran
(74) *Attorney, Agent, or Firm*—Lathrop & Clark LLP

(57) ABSTRACT

A charging bar applies a static charge to a printed label as it is fed in to a grounded adhesive applicator roll. The charged label is drawn to the grounded roll, and thereby obtains even coating of adhesive on the underside of the label, while avoiding contamination of the printed surface of the label with adhesive. The adhesive coated label is carried by a transfer roll to a laminating nip where it is adhered to a corrugated substrate.

8 Claims, 2 Drawing Sheets

SPOT LAMINATOR WITH CHARGING BAR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to apparatus for affixing printed sheets to substrate sheets.

The conventional corrugated carton provided an economical, sturdy, and compact container, readily adapted to products of many types. However, with the corrugated carton often serving as the point of purchase display package, retailers are desirous of packages which combine high quality color printing with sturdy and economical corrugated containers.

The corrugated paperboard itself usually has a surface which is not well suited to high quality color printing. Nonetheless, eye catching printed exteriors may be formed by laminating a separately printed label to the corrugated substrate. The label may cover the entire surface of the substrate blank. However, because the quality printed labels are printed on more costly paper, it is often desirable to apply labels which are smaller than the total exposed surface of the carton blank. This process, known as "spot labeling" permits the higher quality, but more costly, printed labels to be used to best effect.

It is important that any label applied to the carton blank be uniformly adhered, to avoid loose edges which could become folded, soiled, or detached. Furthermore, an unevenly applied label will cause bubbling and/or wrinkling, which present an unattractive appearance. At the same time, to protect the appearance of the printed surface of the label, it is important that no adhesive come in contact with the outwardly facing printed surface of the label. When wet adhesive is applied to the rear surface of the label by a continuously coated rotating roll, it is necessary for the incoming label to make full contact with the adhesive to insure uniform coverage. One known spot labeling machine, the Automatän Model 2000 litho label laminator, described in more detail below, employs a reciprocating "kiss roll" which descends on the label precisely as it is being in-fed to the adhesive applicator roll, applying physical pressure to the leading edge of the label to positively engage the rear surface of the label with the adhesive on the applicator roll. The kiss roll must then be removed from contact with the label during the cycle time until the next label is presented to the applicator roll. This arrangement requires careful calibration to avoid contamination of the kiss roll with adhesive, and the subsequent spoilage of downstream labels.

What is needed is a label laminator which consistently applies labels to an underlying substrate without the possibility of contamination of the printed surface of the labels with adhesive.

SUMMARY OF THE INVENTION

The laminator of this invention applies a static charge to a printed label as it is fed in to a grounded adhesive applicator roll. The charged label is drawn to the grounded roll, and thereby obtains even coating of adhesive on the underside of the label, while avoiding contamination of the printed surface of the label with adhesive. The adhesive coated label is carried by a vacuum transfer roll to a laminating nip where it is adhered to a corrugated substrate.

It is a feature of the present invention to provide a laminator which evenly engages a printed label with a glue applicator roll without mechanically contacting the printed surface of the label.

It is another feature of the present invention to provide a laminator which evenly secures spot labels to a larger substrate, and which avoids application of glue to the printed surface of the labels.

Further objects, features and advantages of the invention will be apparent from the following detailed description when taken in conjunction with the accompanying drawings.

DESCRIPTION OF THE PREFERRED EMBODIMENTS

Figure 1:
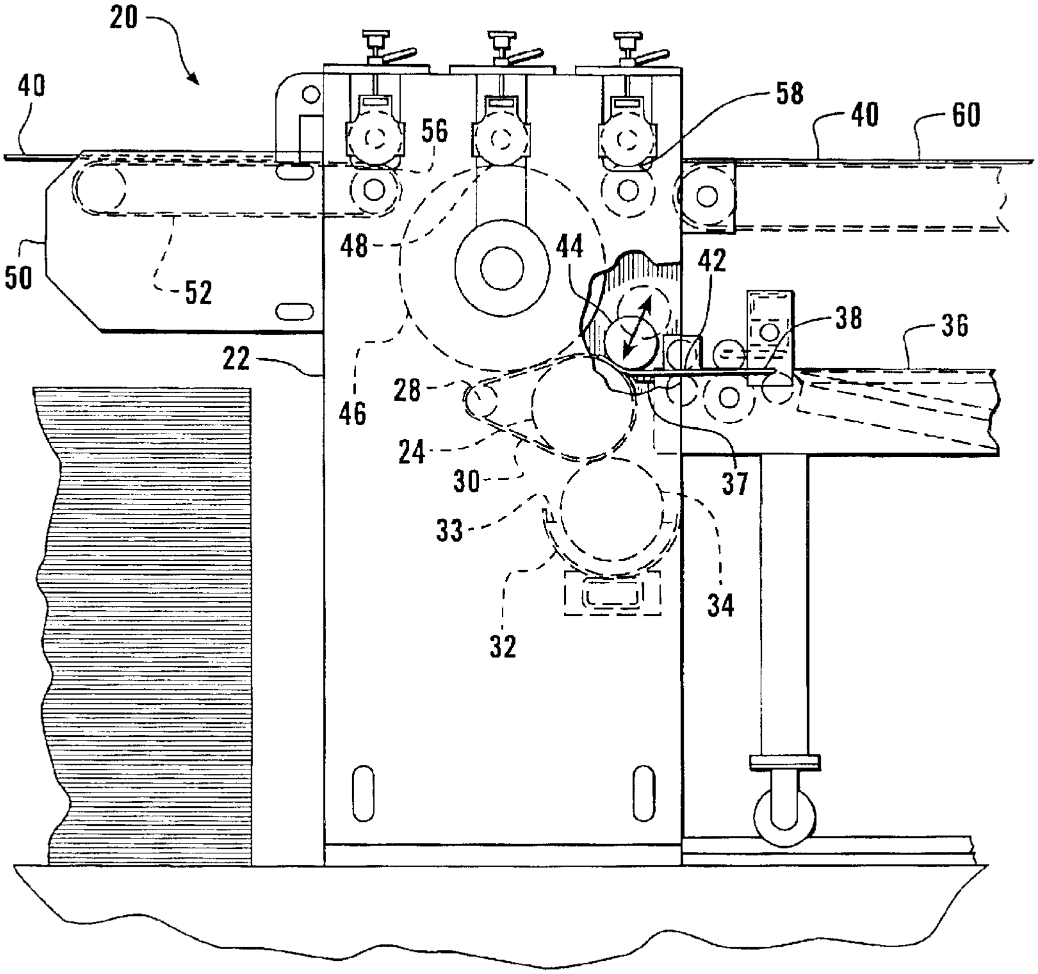
FIG. 1 PRIOR ART
FIG. 1 is a side elevational view, partially broken away in section, of a prior art laminator.
Figure 2:
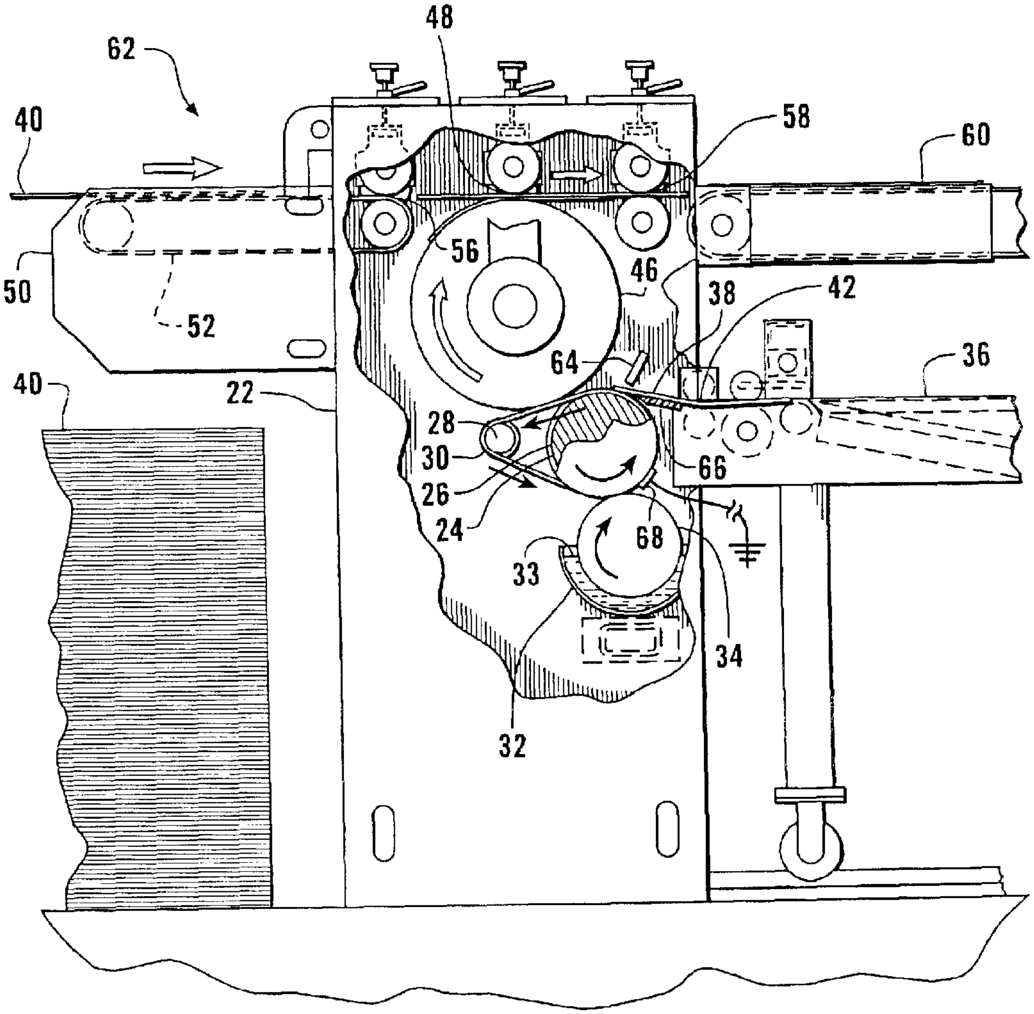
FIG. 2 is a side elevational view, partially broken away in section, of the laminator of this invention.

Referring more particularly to FIGS. 1–2, wherein like numbers refer to similar parts, a prior art spot laminator 20 is shown in FIG. 1. The prior art laminator 20 is of the type once sold by Automatän Incorporated, 2911 Apache Drive, Plover, Wis. 54467, and known as the Automatän Model 2000 litho label laminator. The prior art laminator 20 has a frame 22 which supports a rotatable cylindrical adhesive applicator roll 24. The adhesive applicator roll 24 is a chrome roll having a series of axially spaced circumferential grooves 26, similar to the ones shown in FIG. 2. A belt drive roll 28 is mounted to the frame 22 downstream of the adhesive applicator roll 24 and rotates about an axis which is parallel to the applicator roll 24. Flexible belts 30 extend from the belt drive roll 28 to the grooves 26 in the applicator roll 24. Each belt 30 is as thick as the depth of the groove 26 in which it runs. The spacing between the belts 30 is substantially larger than the widths of the belts themselves, for example, the belts may be about ⅛ inch wide and spaced about two inches apart. Hence a substantially flush surface is presented on the adhesive applicator roll 24. Adhesive 33, for example liquid dextrin adhesive, is supplied from a fountain 32 mounted to the frame 22 beneath the adhesive applicator roll 24. A rubber metering roll 34 is mounted to the frame and extends into the adhesive fountain 32, and engages with the adhesive applicator roll 24 to apply a controlled layer of adhesive 33 to the outwardly facing surface of the adhesive applicator roll 24 and to the belts 30.

A label feed 36 is positioned to discharge label sheets 38 onto a metal in-feed plate 37 and across the in-feed plate to the belts 30 and the adhesive applicator roll 24. The label sheets 38 have an underside which receives adhesive and which is intended to be adhered to a substrate board, and an upper surface which has previously been printed, for example in a multi-color lithography process. Although the adhesive applicator roll 24 is generally at least as long as the width of the substrate 40 board, the label sheet 38 may be substantially narrower, as it may be applied to the substrate to cover less than the entire width of the substrate. As the label sheet 38 leaves a forwarding nip 42 formed between two rollers at the output of the label feed 36, the leading edge of the label sheet is uncontrolled until it engages with the adhesive applicator roll 24. In order to positively bring the label sheet 38 into contact with the adhesive applicator roll 24, the prior art device 20 employed a reciprocating kiss roll 44. The cylindrical kiss roll 44 is rotatable about an axis which is parallel to the axis of the adhesive applicator roll 24, but is mounted to only intermittently be in engagement with the adhesive applicator roll. When the label is between the kiss roll 44 and the adhesive applicator roll 24, the kiss roll is brought down to engage the label sheet 38 with the adhesive on the adhesive applicator roll. However, to avoid contaminating the kiss roll 44 with adhesive 33, the kiss roll is moved away from the adhesive applicator roll 24 once the label sheet 38 has passed under the kiss roll. To avoid any contact of the kiss roll 44 with the adhesive roll to the sides of the label sheet 38, the prior art laminator required that a rubber tube be mounted on the kiss roll 44. The rubber tube, not shown, was cut to an axial length slightly less than the width of the particular label sheet 38 being applied. Because the rubber tube protruded from the kiss roll it alone engaged the label sheet against the adhesive applicator roll, the rubber tube also prevented the main body of the kiss roll 44 from coming into contact with adhesive. However, when labels of different width were used, it was necessary to replace the kiss roll rubber tube.

Where the label sheet 38 comes into contact with and travels on the adhesive applicator roll 24, it is coated with adhesive. The label sheet 38 then travels along the belts 30 and is separated from the adhesive applicator roll 24 and is brought into engagement with a cylindrical vacuum roll 46 rotatably mounted to the frame 22 downstream of the adhesive applicator roll. The vacuum roll 46 engages the non-adhesive covered surface of the label sheet 38, and vacuum is drawn through a plurality of holes in the vacuum roll 46 on the label sheet. The vacuum roll 46 has many holes through which a vacuum is drawn, and those holes which do not coincide with the location of a label sheet are blocked off. The label sheet 38 travels on the vacuum roll and is advanced to a first combining or laminating nip 48 formed between the vacuum roll 46 and a cylindrical laminating roll 46 mounted to the frame 22 above the vacuum roll. A substrate feeder 50 has a moving endless belt 52 which advances individual substrate sheets 40, for example corrugated paperboard sheets, into a first substrate nip 56 located ahead of the first laminating nip 48. The substrate sheet 40 then passes above the adhesive-coated surface of the label sheet 38 as both the substrate sheet and the label sheet pass through the first laminating nip 48, with the result that the label sheet is adhered to the underside of the substrate sheet. The connected substrate sheet 40 and label sheet 38 then progress downstream through an outfeed nip 58 and then out to an outfeed conveyor 60 which removes the finished assemblies from the laminator 20. The vacuum roll 46 makes a full revolution for each label sheet 38. The substrate sheets 40 and label sheets 38 are thus intermittently fed into the apparatus with controlled retractable stop fingers and driven pinch rolls.

The laminator 62 of this invention is shown in FIG. 2, and it is similar to the prior art device 20, except that the laminator 62 has no intermittent kiss roll 44. Instead, a charging bar 64 is mounted to the frame 22 spaced approximately ¾ to 1 inches from the surface of the adhesive applicator roll 24, and positioned to apply a charge to each label sheet 38 prior to its reaching the adhesive applicator roll. The charging bar 64 extends parallel to the axis of the adhesive applicator roll 24 and extends the length of that roll. The charging bar 64 may be of the type available from Simco Industrial Static Control, 2257 North Penn Road, Hatfield, Pa. 19440, such as the arc resistant Pinner Charging Bar, described at http://simco-static.com/simco/pdfs/Pinner.pdf. The label sheets 38 are advanced from the label feed 36 over an electrically insulative plastic in-feed plate 66. The in-feed plate 66 may be fabricated of natural nylon, and is about 3½ inches long in the direction of travel of the label sheets. The underside of the in-feed plate 66 is beveled near the adhesive applicator roll. The in-feed plate may terminate approximately at the location of the charging bar 64.

As the label sheets 38 pass beneath the charging bar 64, a charge is imposed upon the sheets. The adhesive applicator roll 24 is grounded, and the charged label sheets 38 thus are drawn to the grounded applicator roll 24 and the adhesive disposed thereon, giving uniform coverage of adhesive to the underside of each label sheet, while avoiding contact between any roll which might have contact with the adhesive and the printed surface of the label sheet. The adhesive applicator roll 24 is grounded by two copper contacts 68 which make electrical contact with the exterior surface of the applicator roll 24. Each contact 68 is a curved segment of copper formed to the same curvature as the adhesive applicator roll 24. Each contact 68 may extend about two inches along the periphery of the adhesive applicator roll 24, and is about ⅜ inches thick, and about one inch wide. A spring, not shown, retains each contact 68 in electrical contact with the adhesive applicator roll 24. One contact 68 is shown schematically in FIG. 2, but maybe positioned where desired around the circumference of the roll 24. Contacts 68 are positioned on each axial end of the roll 24, beyond the positions where a label will extend. The contacts 68 are connected by a copper wire to ground, for example, the ground found on the charging bar power supply.

The charging bar may be envisioned as spraying electrons onto the surface of the label. Because the label is nonconducting, the electrons generally remain immobile on the surface, thus giving the overall sheet and each part of the sheet a negative charge. Opposite charges attract. Because the roll is grounded, the negative charge on the label sheet produces a positive charge on the glue roll and so the label is attracted. The range of operation of the charging bar is from −30 kV to +30 kV. Generally, imparting a negative charge to the label sheets is desirable. However, depending on ambient conditions, the preexisting charge on the incoming label sheets and other factors, it may be useful to adjust the charge to be positive. The charging bar 64 is connected to a conventional power supply, not shown, such as the Chargemaster power supply available from Simco Industrial Static Control.

The label sheet 38 is then carried off the adhesive applicator roll 24 by the belts 30, is picked up by the vacuum roll, and carried to the first laminating nip where it is pressed into engagement with the substrate 40. Because of the uniform application of adhesive, the label sheet 38 is more likely to be uniformly adhered to the substrate 40.

The apparatus 62, while it will commonly apply adhesive to a single label at a time, is readily suited to operating on two or more label sheets abreast. In such a case the label feed 36 provides the multiple label sheets simultaneously to pass beneath the charging bar 64 and on to the adhesive applicator roll. The charging bar 64 in one form has an array of downwardly projecting short wires. When the label sheets extend across less than the entire length of the charging bar, plastic covering may be temporarily affixed to the charging bar to block the effect of those sections of the charging bar which are not needed.

It should be noted that the laminator of this invention may utilize other conventional transfer means for transferring the adhesive coated label sheet from the glue applicator roll to the laminating nip. Although the illustrated apparatus employs a vacuum roll as a means for transferring the label sheet, a vacuum transfer belt may also be used. In such a case the plurality of belts 30 may be replaced with stripping knives which separate the label sheet from the adhesive applicator roll. Other pneumatic or mechanical engagement mechanisms may also be used to advance the adhesive coated label sheet. In addition, although the adhesive fountain may comprise a separate container with a metering roll therein, as disclosed in the figures, the fountain may comprise a quantity of adhesive disposed above a nip formed between the adhesive applicator roll and the metering roll.

It is understood that the invention is not limited to the particular construction and arrangement of parts herein illustrated and described, but embraces all such modified forms thereof as come within the scope of the following claims.

I claim:

1. In a laminator for attaching a label sheet having an upper side and a lower side to an underlying substrate sheet, the laminator comprising:

a frame an adhesive fountain containing a quantity of liquid adhesive;

a rotatable adhesive applicator roll mounted to the frame to receive adhesive from the fountain, the adhesive applicator roll having a surface which receives the adhesive;

a label feed positioned to discharge label sheets to the adhesive applicator roll surface to apply adhesive to the lower side of each label sheet;

a rotating transfer roll mounted to the frame to engage the upper side of each label sheet and receive each label sheet as it passes from the adhesive applicator roll;

a laminating nip defined between two rolls; and a substrate feed positioned to advance substrate sheets to the laminating nip, the transfer roll discharging each adhesive coated label sheet such that the lower side of each label sheet engages a substrate sheet at the laminating nip, the label sheet being thus attached to the substrate sheet at the laminating nip, the improvement comprising:

a charging bar spaced from the adhesive applicator roll to apply a static charge to the label sheet as it is discharged from the label feed prior to its engagement with the adhesive on the applicator roll surface, to thereby cause the label sheet to be attracted toward the adhesive applicator roll surface for the uniform application of adhesive to the lower side of the label sheet.

2. The laminator of claim 1 wherein the adhesive applicator roll is electrically grounded.

3. The laminator of claim 2 wherein a metal contact engages an exterior surface of the adhesive applicator roll to electrically connect the adhesive applicator roll to ground.

4. The laminator of claim 1 wherein an electrically insulative in-feed plate is positioned between the label feed and the adhesive applicator roll, such that the label sheets pass over the in-feed plate to receive the static charge applied by the charging bar.

5. A laminator for attaching a label sheet having an upper side and a lower side to an underlying substrate sheet, the laminator comprising:

a frame;

a quantity of adhesive;

a rotatable adhesive applicator roll mounted to the frame to receive adhesive from the quantity of adhesive, the adhesive applicator roll having a surface which receives the adhesive;

a label feed positioned to discharge label sheets to the adhesive applicator roll surface;

a charging bar spaced from the adhesive applicator roll to apply a static charge to the label sheet as it is discharged from the label feed prior to its engagement with the adhesive on the applicator roll, to thereby cause the label sheet to be attracted toward the adhesive applicator roll surface for the uniform application of adhesive to the lower side of the label sheet;

a laminating nip positioned downstream of the adhesive applicator roll;

a means for transferring the label sheet from the adhesive applicator roll to the laminating nip; and a substrate feed positioned to advance substrate sheets to the laminating nip to engage a substrate sheet with the lower side of each label sheet to thus attach each label sheet to the substrate sheet at the laminating nip.

6. The laminator of claim 5 wherein the adhesive applicator roll as electrically grounded.

7. The laminator of claim 6 wherein the a metal contact engages an exterior surface of the adhesive applicator roll to electrically connect the adhesive applicator roll to ground.

8. The laminator of claim 5 wherein an electrically insulative in-feed plate is positioned between the label feed and the adhesive applicator roll, such that the label sheets pass over the in-feed plate to receive the static charge applied by the charging bar.

* * * * *